United States Patent [19]

Chang

[11] 3,977,470
[45] Aug. 31, 1976

[54] OIL RECOVERY BY ALKALINE-SULFONATE WATERFLOODING

[75] Inventor: Harry L. Chang, Dallas, Tex.

[73] Assignee: Mobil Oil Corporation, New York, N.Y.

[22] Filed: Apr. 30, 1975

[21] Appl. No.: 573,235

Related U.S. Application Data

[63] Continuation-in-part of Ser. No. 553,697, Feb. 27, 1975.

[52] U.S. Cl. .................................. 166/273; 166/274
[51] Int. Cl.$^2$ .......................................... E21B 43/16
[58] Field of Search ............ 166/273, 274, 275, 270

[56] References Cited
UNITED STATES PATENTS

| | | | |
|---|---|---|---|
| 3,111,985 | 11/1963 | Reisberg | 166/270 |
| 3,298,436 | 1/1967 | McCardell | 166/270 |
| 3,387,655 | 6/1968 | Hurd | 166/273 |
| 3,414,053 | 12/1968 | Treiber et al. | 166/273 |
| 3,464,492 | 9/1969 | Friedman | 166/270 |
| 3,478,823 | 11/1969 | Murphy | 166/274 |
| 3,498,379 | 3/1970 | Murphy | 166/275 |
| 3,532,166 | 10/1970 | Williams | 166/275 |
| 3,777,817 | 12/1973 | Feuerbacher | 166/273 |
| 3,804,171 | 4/1974 | Krehbiel et al. | 166/274 |

Primary Examiner—Ernest R. Purser
Assistant Examiner—Jack E. Ebel
Attorney, Agent, or Firm—C. A. Huggett; William D. Jackson
Agent—C. A. Huggett

[57] ABSTRACT

Recovery of oil from a subterranean reservoir employing an alkaline agent-sulfonate surfactant system in conjunction with the injection of a sacrificial system comprising an inorganic polyphosphate and an alkali metal carbonate. An aqueous initiaion slug containing an inorganic polyphosphate, an alkali metal carbonate and an alkaline agent selected from the group consisting of alkali metal and ammonium hydroxides is injected into the reservoir. The initiation slug is followed by the injection of an aqueous surfactant slug which contains an alkaline agent and a sulfonate surfactant. After injection of the surfactant slug, an aqueous flooding medium is injected in order to displace the oil within the reservoir to a production system from which it is recovered. The surfactant slug may also contain an inorganic polyphosphate and alkali metal carbonate and the concentrations of these agents in the surfactant slug may be lower than in the initiation slug.

7 Claims, 1 Drawing Figure

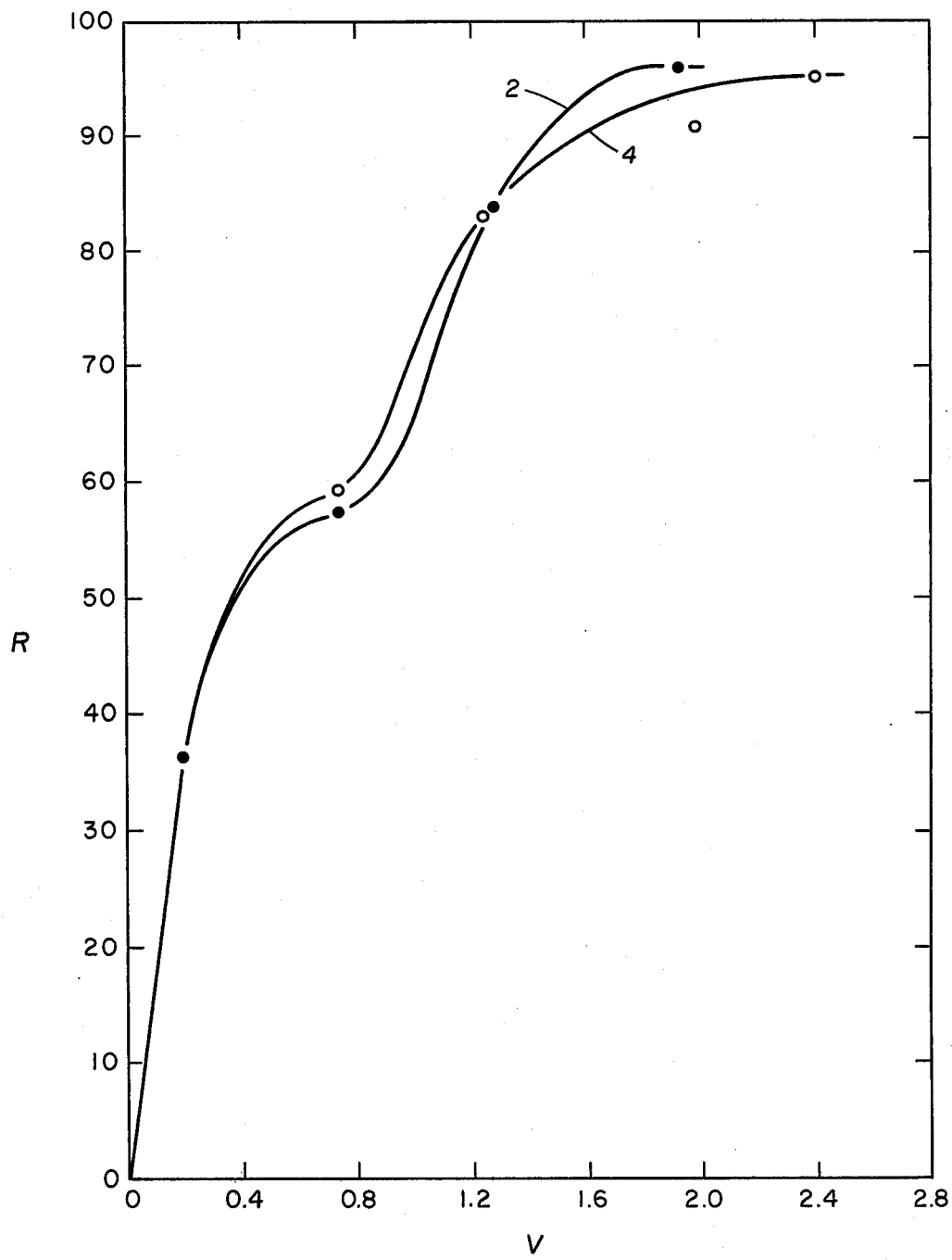

OIL RECOVERY BY ALKALINE-SULFONATE WATERFLOODING

CROSS-REFERENCE TO RELATED APPLICATION

This application is a continuation-in-part of pending U.S. patent application Ser. No. 553,697, filed Feb. 27, 1975, by Harry L. Chang.

BACKGROUND OF THE INVENTION

This invention relates to the recovery of oil from subterranean oil reservoirs and more particularly to alkaline-sulfonate waterflooding involving the injection of an inorganic polyphosphate and an alkali metal carbonate.

In the recovery of oil from oil-bearing reservoirs, it is usually possible to recover only minor portions of the original oil in place by the so-called primary recovery methods which utilize only the natural forces present in the reservoir. Thus a variety of supplemental recovery techniques have been employed in order to increase the recovery of oil from subterranean reservoirs. The most widely used supplemental recovery technique is waterflooding which involves the injection of water into an oil-bearing reservoir. As the water moves through the reservoir, it acts to displace oil therein to a production system composed of one or more wells through which the oil is recovered.

It has long been recognized that factors such as the interfacial tension between the injected water and the reservoir oil, the relative mobilities of the reservoir oil and injected water, and the wettability characteristics of the rock surfaces within the reservoir are factors which influence the amount of oil recovered by waterflooding. Thus it has been proposed to add surfactants to the injected water in order to lower the oil-water interfacial tension and/or to alter the wettability characteristics of the reservoir rock. Also, it has been proposed to add thickening agents to all or part of the injected water in order to increase the viscosity thereof, thus decreasing the mobility ratio between the injected water and oil and improving the sweep efficiency of the waterflood.

Processes which involve the injection of aqueous surfactant solutions in order to reduce the oil-water interfacial tension are commonly referred to as low tension waterflooding techniques. A practical problem encountered in such waterflooding techniques resides in the adsorption of the surfactants upon the rock surfaces of the reservoir. In this regard the surfactants (or other solutes which may be present in the injected flooding medium) move through the reservoir by means of a chromatographic adsorption/desorption process. Since the rate of desorption is less than the rate of adsorption, the surfactants are transported through the reservoir at a rate lower than that of the aqueous carrier fluid. Thus, the surfactant concentration at the flood front where the injected water contacts the reservoir oil decreases with the result that the desired low interfacial tension is not achieved. To counter this, it has been proposed, as taught for example in U.S. Pat. No. 3,469,630 to Hurd et al., to employ inorganic polyphosphate wetting agents which act as sacrificial agents to satisfy adsorption sites within the reservoir, thus decreasing adsorption of the surfactant. The inorganic polyphosphates, such as sodium tripolyphosphate or tetrasodium pyrophosphate, normally are introduced in a pretreatment slug injected prior to the surfactant slug and also in the surfactant slug itself. As taught by Hurd et al., such inorganic polyphosphates may be employed as the sole sacrificial agent or may be employed in combination with a soluble carbonate such as sodium carbonate.

Another surfactant waterflooding technique is taught in U.S. Pat. No. 3,847,823 to Clark et al. which discloses the use of an anionic waterflood additive characterized as an overbased sulfonate. The overbased sulfonate is arrived at by adding a base component, such as an alkali metal hydroxide, carbonate or bicarbonate, to a sulfonate mixture composed of a water-soluble sulfonate having an average equivalent weight of about 200 to about 400 and an oil-soluble sulfonate having an equivalent weight of about 400 to about 600. The base component is added in an amount over that required to neutralize the sulfonate such that the ratio of the weight of excess base component to the weight of the sulfonate is within the range of 0.03–2.0 and desirably within the range of 0.20–1.0. Overbasing may be arrived at in situ or prior to injection. In the former case, the sulfonate derived from a pale oil extract may be injected into the formation and this sulfonate slug then followed by an effective amount of an alkali metal hydroxide or alkali metal carbonate solution. The neutralized sulfonate mixture may be present in an amount within the range of 0.5–25 weight percent and may contain a chelating agent such as trisodium phosphate monohydrate to chelate calcium and/or magnesium ions.

Another waterflooding procedure, in which surfactants are formed in situ, involves alkaline waterflooding. In this process an aqueous solution of an alkali metal or ammonium hydroxide or carbonate is injected in order to neutralize organic acids in the reservoir oil to produce the corresponding alkali metal or ammonium salts. An improved alkaline waterflooding process is described in U.S. Pat. No. 3,927,716 to Ralph F. Burdyn, Harry L. Chang, and William R. Foster, and entitled "ALKALINE WATERFLOODING PROCESS". In this process an aqueous alkaline solution is employed in which the alkalinity and monovalent salt salinity of the solution are controlled within defined ranges in order to result in low oil-water interfacial tensions which enhance the microscopic displacement of oil from the interstices of the reservoir rock. A thickened water slug may be used for the purpose of mobility control in the alkaline waterflood. As recognized in the Burdyn et al. application, the results achieved by alkaline waterflooding and the roles played by the various recovery mechanisms involved depend to some extent upon the molecular weight distribution of the organic acids within the reservoir oil.

An additional factor which is relevant to the efficacy of an alkaline waterflood is the total acid content of the reservoir oil. This is commonly measured by the "acid number" which is defined as the milligrams of potassium hydroxide required to neutralize the acids in one gram of crude oil in a nonaqueous-type titration. Various procedures have been proposed for the alkaline waterflooding of those reservoirs in which the crude oil is considered to have an inadequate acid content as indicated by the acid number. Air, peroxides, or other oxidizing agents may be injected into the reservoir in order to oxidize the oil in situ to form additional organic acids. Additionally, a preoxidized oil bank may be injected or high molecular weight acids may be added to the injected oil bank. In any case, an aqueous alkaline solution is injected in order to form the sodium salts of the organic acids.

A further alkaline waterflooding technique which is useful in reservoirs containing oil exhibiting low to intermediate acid numbers is set forth in U.S. Pat. application Ser. No. 570,686, filed Apr. 23, 1975, by Ralph F. Burdyn, Harry L. Chang, and Evin L. Cook, entitled "OIL RECOVERY BY ALKALINE-SURFACTANT WATERFLOODING".

In this process, the interfacial tension between the reservoir oil and the injected water is reduced to a desired low value through the use of a system comprising a sulfonate surfactant and also an alkaline agent which functions to convert the organic acids within the reservoir to the corresponding surface-active monovalent metal soaps. In this procedure, there is injected an aqueous initiation slug containing an alkaline agent selected from the group consisting of the alkali metal and ammonium hydroxides. Subsequent to the injection of the initiation slug an aqueous surfactant slug is injected. This slug contains an alkaline agent and also a sulfonate surfactant.

Yet another beneficial alkaline waterflooding process is disclosed in the aforementioned parent application Ser. No. 553,697. As described in that application, an inorganic polyphosphate is employed in conjunction with alkaline waterflooding in order to increase the amount of alkaline agent available for the in situ formation of surfactants by complexing divalent metal ions within the reservoir and buffering the pH of the alkaline solution as well as by satisfying adsorption sites within the reservoir. In this procedure, an aqueous pretreatment solution containing an inorganic polyphosphate is injected into the reservoir, and this pretreatment solution is followed by the injection of an aqueous alkaline solution. The alkaline solution may also contain an inorganic polyphosphate which in most cases will be in a somewhat lower concentration than the polyphosphate concentration of the pretreatment solution.

SUMMARY OF THE INVENTION

In accordance with the present invention, there is provided a new and improved alkaline waterflooding process in which an alkaline agent-sulfonate surfactant system is employed in conjunction with the injection of a sacrificial system comprising an inorganic polyphosphate and an alkali metal carbonate. In carrying out the invention, an aqueous initiation slug containing an inorganic polyphosphate, an alkali metal carbonate, and an alkaline agent selected from the group consisting of alkali metal and ammonium hydroxides is injected into the subterranean reservoir by means of a suitable injection system. Thereafter, an aqueous surfactant solution is injected which contains an alkaline agent and also a sulfonate surfactant. After injection of the surfactant slug, a suitable aqueous flooding medium is injected into the reservoir through the injection system in order to displace the reservoir oil to a spaced production system from which it is recovered.

In a preferred embodiment of the invention, an inorganic polyphosphate and alkali metal carbonate are present in the surfactant slug as well as in the initiation slug. In this embodiment of the invention, it is preferred that the concentration of polyphosphate and carbonate in the surfactant slug be lower than the concentration of these agents in the initiation slug.

BRIEF DESCRIPTION OF THE DRAWING

The drawing is a graph illustrating comparative oil recoveries achieved with relatively high and relatively low polyphosphate and carbonate concentrations in the surfactant slug relative to the initiation slug.

DESCRIPTION OF SPECIFIC EMBODIMENTS

As noted in the aforementioned Burdyn et al. application Ser. No. 570,686 filed Apr. 23, 1975, the use of alkaline agent-sulfonate surfactant system in flooding reservoirs containing oil of low to intermediate acid numbers offers certain advantages over straight alkaline waterflooding. The salinity range over which low interfacial tensions may be attained is broadened somewhat by the use of sulfonate in combination with the alkaline agent. In addition, the equilibrium interfacial tension time for a given aqueous sulfonate solution-crude oil system is reduced by the addition of an alkaline agent to the aqueous surfactant solution. The aforementioned application Ser. No. 553,697 by Chang discloses that benefits may be derived by the use of an inorganic polyphosphate additive in alkaline waterflooding. Specifically, the use of an inorganic polyphosphate such as sodium tripolyphosphate or tetrasodium pyrophosphate functions through a number of mechanisms to increase the availability of alkaline agent for reaction with organic acids in the reservoir oil.

In accordance with the present invention, inorganic polyphosphates such as disclosed in the aforementioned Chang application may be employed in combination with an alkali metal carbonate in order to increase the oil displacement efficiency of an alkaline agent-sulfonate surfactant system of the type disclosed in the aforementioned Burdyn et al. application Ser. No. 570,686 filed Apr. 23, 1975.

The alkaline agents employed in the present invention are the same as those set forth in this application Ser. No. 570,686 namely, the alkali metal and ammonium hydroxides. The alkaline agent is employed in an initiation slug and in a surfactant slug similarly as in this application and normally will be employed in the same concentrations as taught therein. Thus, the alkaline agent is employed in the initiation slug in an amount necessary to provide a solution pH within the range of 11.5 to 13 and in the subsequently injected surfactant slug in an amount to provide a solution pH within the range of 11 to 13. The concentration of alkaline agent in the surfactant slug normally will be somewhat lower than the concentration of alkaline agent in the initiation slug. It usually will be desirable to employ one of the alkali metal hydroxides since they are stronger bases than ammonium hydroxide and of these sodium hydroxide normally will be preferred from the standpoint of economy and availability.

The sulfonate-type surfactants which may be employed in carrying out the present invention are also disclosed in application Ser. No. 570,686 by Burdyn et al. The preferred surfactants are alkyl aryl sulfonates having an average molecular weight within the range of 300–500. Normally, petroleum sulfonates derived from sulfonation of petroleum oil or petroleum oil fractions will be used for reasons described in greater detail in the Burdyn et al. application. The sulfonate surfactant normally will be added to the surfactant slug in an amount within the range of 0.1 to 2.0 weight percent.

To demonstrate the results obtained by the injection of an inorganic polyphosphate and an alkali metal carbonate in conjunction with alkaline-sulfonate surfactant system in accordance with the present invention, comparative oil displacement experiments were carried out to simulate waterflooding employing various combinations of chemicals including alkaline agent, inorganic polyphosphate, carbonate, and sulfonate. The linear displacement experiments were performed in 3-foot-long flow tubes having an inside diameter of 0.308 inch and packed with unconsolidated reservoir sands. The reservoir sands were disaggregated from dry core materials that were not subject to chemical cleaning prior to packing into the tubes.

For each tube run, the sand packed tube was saturated with saline water produced from the reservoir from which the disaggregated sands were obtained. The amount of water necessary to achieve saturation was measured in order to determine the total pore volume amount within the tube. The tube was then flooded with oil from the reservoir from which the sands were obtained until the effluent from the tube contained no water. The total amount of water displaced from the tube during this operation was measured in order to determine the initial oil saturation. Thereafter the various injection schemes described below were carried out to determine the residual oil saturation and the percent of original oil recovered.

The monovalent salt salinity of the various aqueous solutions injected was adjusted by the addition of sodium chloride. In those cases where thickened water was used, the polymer employed was the ionic polysaccharide B-1459 and produced by fermentation of glucose with the bacterium Xanthomonas campestris NRRL-B-1459, USDA, and available from the Kelco Chemical Company under the trade name "Kelzan". Sodium hydroxide was used as the alkaline agent and in all the runs but two as noted below, the sulfonate surfactant requirements are met by the use of a petroleum sulfonate having an average molecular weight of about 420 and available from the Witco Chemical Company under the trade name "Petronate TRS 10–80". The molecular weight is calculated as the equivalent weight for the sodium form assuming 100 percent monosulfonation. The inorganic polyphosphate used throughout the runs was sodium tripolyphosphate, and sodium carbonate was the alkali metal carbonate employed.

One suite of comparative oil displacements was carried out in which the oil used to saturate the sand was a crude oil exhibiting an acid number of 0.317. The results of this suite of experiments are summarized in Table I which shows the percent initial oil saturation, $S_{oi}$, the residual or final oil saturation at the conclusion of the tube run, $S_{or}$, the percent oil recovery, the sodium chloride concentration in weight percent of each of three sequentially injected slugs II, III, and IV, and the size of these slugs and the various additive concentrations in the slugs.

In each of the displacement tests summarized in Table I, an initial protective slug (not shown in the Table) was injected for every run except for Run 1 which was a continuous injection experiment and for Run 1A which was a continuation of Run 1. The protective slug was injected in an amount of 0.3 pore volume and comprised fresh field water containing sodium chloride in the concentration indicated in the Table. Slug IV in each case was injected in the pore volume amounts indicated and also comprised fresh field water containing sodium chloride in the concentration indicated, but without other additives.

Under slug III in Table I, the concentration of petroleum sulfonate in weight percent is indicated as is the amount of petroleum sulfonate used in milligrams of sulfonate per gram of sand. For Runs 1A through 37, the petroleum sulfonate employed was TRS 10–80 identified previously. In Run 38, the surfactant slug contained 1.5 weight percent of a mixture of equal portions of TRS 10–80 and petroleum sulfonates TRS 40 and TRS 18, also available from the Witco Chemical Company. TRS 18 is a petroleum sulfonate having an average molecular weight of about 495 and TRS 40 is a petroleum sulfonate having an average molecular weight of about 340. Slug III for Run 39 contained 0.5 weight percent of TRS 40 and 1.0 weight percent of TRS 10–80 for a total sulfonate concentration of 1.5 weight percent.

TABLE I

| Run No. | $S_{oi}$ (%) | $S_{or}$ (%) | Recovery (%) | Salinity NaCl (%) | Slug II Size (PV) | Slug II NaOH (N) | Slug II STPP (%) | Slug II $Na_2CO_3$ (%) | Slug III Size (PV) | Slug III NaOH (N) | Slug III STPP (%) | Slug III $Na_2CO_3$ (%) | TRS 10–80 (%) | TRS 10–80 mg/g Sand | Slug IV Size (PV) |
|---|---|---|---|---|---|---|---|---|---|---|---|---|---|---|---|
| 1 | 60.97 | 27.64 | 54.67 | 0.6 | Continuous injection | | | | | | | | | | 1.2 |
| 1A | 27.64 | 7.69 | | 0.6 | 0.3 | 0.04 | 0.25 | 0.25 | 0.5 | 0.01 | 0.05 | 0.05 | 1.5 | 1.57 | 0.9 |
| 2 | 61.22 | 6.71 | 89.05 | 0.6 | 0.3 | 0.04 | 0.25 | 0.25 | 0.5 | 0.01 | 0.05 | 0.05 | 1.5 | 1.57 | 1.0 |
| 3 | 61.22 | 8.45 | 86.19 | 0.6 | 0.3 | 0.04 | 0.25 | 0.25 | 0.2 | 0.01 | 0.05 | 0.05 | 1.5 | 0.63 | 1.3 |
| 4 | 61.06 | 5.88 | 90.37 | 0.6 | 0.3 | 0.04 | | | 0.3 | 0.01 | | | 1.5 | 0.94 | 1.2 |
| 5 | 60.62 | 5.95 | 90.19 | 0.6 | 0.3 | | 0.50 | | 0.3 | | 0.10 | | 1.5 | 0.94 | 1.3 |
| 6 | 60.06 | 5.10 | 91.51 | 0.6 | 0.3 | | | 0.50 | 0.3 | | | 0.10 | 1.5 | 0.94 | 1.3 |
| 7 | 59.58 | 4.43 | 92.57 | 0.6 | 0.3 | 0.04 | 0.50 | | 0.3 | 0.01 | 0.10 | | 1.5 | 0.94 | 1.3 |
| 8 | 59.88 | 5.99 | 90.00 | 0.6 | 0.3 | 0.04 | | 0.50 | 0.3 | 0.01 | | 0.10 | 1.5 | 0.94 | 1.1 |
| 9 | 59.43 | 5.71 | 90.38 | 0.6 | 0.3 | | 0.25 | 0.25 | 0.3 | | 0.05 | 0.05 | 1.5 | 0.94 | 1.3 |
| 10 | 60.71 | 5.95 | 90.20 | 0.6 | 0.3 | 0.04 | 0.25 | 0.25 | 0.3 | 0.01 | 0.05 | 0.05 | 1.5 | 0.94 | 1.1 |
| 11 | 60.30 | 7.16 | 88.12 | 0.6 | 0.3 | 0.04 | 0.25 | 0.25 | 0.3 | 0.01 | 0.05 | 0.05 | 1.0 | 0.63 | 1.2 |
| 12 | 60.17 | 9.46 | 84.28 | 0.6 | 0.3 | 0.04 | 0.25 | 0.25 | 0.3 | 0.01 | 0.05 | 0.05 | 0.5 | 0.31 | 1.2 |
| 13 | 60.17 | 14.61 | 75.71 | 1.0 | | | | | 0.3 | | | | 1.5 | 0.94 | 1.8 |
| 14 | 60.71 | 0.89 | 98.53 | 1.0 | 0.3 | | 0.50 | | 0.3 | | 0.10 | | 1.5 | 0.95 | 1.3 |
| 15 | 60.52 | 1.44 | 97.62 | 1.0 | 0.3 | 0.04 | 0.50 | | 0.3 | 0.01 | 0.10 | | 1.5 | 0.94 | 1.1 |
| 16 | 61.49 | 2.01 | 96.73 | 1.0 | 0.3 | 0.04 | | 0.50 | 0.3 | 0.01 | | 0.10 | 1.5 | 0.94 | 1.1 |
| 17 | 59.46 | 3.79 | 93.63 | 1.0 | 0.3 | 0.04 | 0.25 | 0.25 | 0.3 | 0.01 | 0.05 | 0.05 | 1.5 | 0.94 | 1.2 |
| 18 | 60.92 | 3.45 | 94.34 | 1.0 | 0.3 | | 0.25 | 0.25 | 0.3 | | 0.05 | 0.05 | 1.5 | 0.94 | 1.4 |
| 19 | 60.62 | 1.70 | 97.20 | 1.5 | 0.3 | | 0.50 | | 0.3 | | 0.10 | | 1.5 | 0.94 | 1.2 |
| 20 | 60.87 | 0.00 | 100.00 | 1.5 | 0.3 | 0.04 | 0.50 | | 0.3 | 0.01 | 0.10 | | 1.5 | 0.94 | 1.1 |
| 21 | 63.93 | 3.81 | 94.04 | 0.6 | 0.3 | 0.04 | 0.50 | | 0.3 | 0.01 | 0.10 | | 1.5 | 0.99 | 1.1 |
| 22 | 63.72 | 11.80 | 81.48 | 0.8 | 0.3 | 0.04 | 0.50 | | 0.1 | 0.01 | 0.10 | | 1.5 | 0.33 | 1.1 |
| 23 | 64.51 | 5.87 | 90.91 | 0.8 | 0.3 | 0.04 | 0.50 | | 0.2 | 0.01 | 0.10 | | 1.5 | 0.66 | 1.0 |
| 24 | 60.61 | 2.42 | 96.00 | 1.0 | 0.3 | 0.04 | 0.50 | | 0.2 | 0.01 | 0.10 | | 1.5 | 0.63 | 1.2 |
| 25 | 60.53 | 4.15 | 93.14 | 1.0 | 0.3 | 0.04 | 0.50 | | 0.3 | 0.01 | 0.10 | | 1.0 | 0.63 | 1.1 |
| 26 | 64.81 | 2.47 | 96.19 | 1.0 | 0.3 | | 0.50 | 0.50 | 0.2 | | 0.10 | 0.10 | 1.5 | 0.63 | 0.9 |

TABLE I-continued

| Run No. | $S_{oi}$ (%) | $S_{or}$ (%) | Recovery (%) | Salinity NaCl (%) | Slug II Size (PV) | NaOH (N) | STPP (%) | $Na_2CO_3$ (%) | Slug III Size (PV) | NaOH (N) | STPP (%) | $Na_2CO_3$ (%) | Slug IV TRS 10-80 (%) | mg/g Sand | Size (PV) |
|---|---|---|---|---|---|---|---|---|---|---|---|---|---|---|---|
| 27 | 64.29 | 2.76 | 95.65 | 1.0 | 0.3 | 0.04 | 0.50 | 0.50 | 0.2 | 0.01 | 0.10 | 0.10 | 1.5 | 0.63 | 1.0 |
| 28 | 64.79 | 3.43 | 94.71 | 1.0 | 0.3 | 0.04 |  | 0.50 | 0.2 | 0.01 |  | 0.10 | 1.5 | 0.63 | 1.0 |
| 29 | 63.75 | 8.13 | 87.25 | 1.0 | 0.3 | 0.04 | 0.50 |  | 0.1 | 0.01 | 0.10 |  | 1.5 | 0.31 | 1.0 |
| 30 | 64.15 | 0.00 | 100.00 | 1.0 | 0.3 | 0.04 | 0.50 |  | 0.3 | 0.01 | 0.10 |  | 1.5 | 0.94 | 1.0 |
| 31 | 63.93 | 1.76 | 97.25 | 1.0 | 0.3 | 0.04 | 0.50 |  | 0.3 | 0.01 | 0.10 |  | 1.5 | 0.94 | 1.0 |
| 32 | 63.90 | 14.79 | 76.85 | 1.0 | 0.3 | 0.04 | 0.50 |  | 0.15 | 0.01 | 0.10 |  | 1.0 | 0.33 | 1.0 |
| 33 | 63.22 | 9.77 | 84.55 | 1.2 | 0.3 | 0.04 | 0.50 |  | 0.1 | 0.01 | 0.10 |  | 1.5 | 0.33 | 1.0 |
| 34 | 63.66 | 2.70 | 96.70 | 1.2 | 0.3 | 0.04 | 0.50 |  | 0.2 | 0.01 | 0.10 |  | 1.5 | 0.65 | 1.2 |
| 35 | 59.17 | 17.16 | 71.00 | 1.5 | 0.3 | 0.04 | 0.50 |  | 0.2 | 0.01 | 0.10 |  | 1.0 | 0.42 | 1.1 |
| 36 | 60.00 | 0.58 | 99.03 | 1.5 | 0.3 |  | 0.50 | 0.50 | 0.3 |  | 0.10 | 0.10 | 1.5 | 0.94 | 1.1 |
| 37 | 64.00 | 6.10 | 90.48 | 1.0 | 0.3 | 0.04 | 0.50 |  | 0.2 | 0.01 | 0.10 |  | 1.5 | 0.64 | 1.2 |
| 38 | 63.37 | 16.86 | 73.39 | 1.0 | 0.3 | 0.04 | 0.50 |  | 0.2 | 0.01 | 0.10 |  |  |  | 1.5 |
| 39 | 64.24 | 7.88 | 87.73 | 1.0 | 0.3 | 0.04 | 0.50 |  | 0.2 | 0.01 | 0.10 |  |  |  | 1.0 |

The petroleum sulfonates employed in these experiments, like other commercially available petroleum sulfonates, normally are marketed as products containing about 50 to 80 percent active sulfonates with the remainder constituting impurities such as oil, water, and sodium sulfate and other inorganic salts. The sulfonate concentrations set forth herein are given on a weight percent active basis excluding the presence of other impurities in the product.

Further with respect to the data presented in Table I, Runs 1 through 20 and Run 31 were carried out at a temperature of 77° C. The remaining runs tabulated in the Table were carried out at a temperature of 71° C.

Referring specifically to the several runs set forth in Table I, Run 1 represents a base case in which the injection medium used was fresh field water containing 0.6 percent by weight sodium chloride but no other additives. Runs 2, 3, 10, 11, 12, 17, and 27 simulate the practice of the present invention employing sodium tripolyphosphate and sodium carbonate in both the initiation slug (slug II) containing the alkaline agent and in the surfactant slug containing the alkaline and the sulfonate surfactant. Run 1A also employed these additives in both slugs II and III but since it represents a continuation of Run 1 in the same tube, the percent oil recovery was not calculated.

Run 4 represents a base case employing sodium hydroxide in the initiation slug and sodium hydroxide and sulfonate in the surfactant slug but without the addition of inorganic polyphosphate or carbonate to either of these slugs.

Runs 5, 14, and 19 simulate an injection format in which slug II contained only sodium tripolyphosphate (without the addition of alkaline agent or carbonate) and slug III contained sodium tripolyphosphate and petroleum sulfonate but again without the addition of alkaline agent or carbonate. Run 6 illustrates a somewhat similar injection format except in this case sodium carbonate rather than sodium tripolyphosphate was employed in both slugs II and III. Sodium hydroxide also was not employed in either of slugs II or III in Runs 9, 18, 26, and 36. However, in these runs, both the phosphate additive and the carbonate were present in slugs II and III.

Runs 7, 15, 20 through 25, 29 through 35, and 37 through 39 involved the injection of sodium hydroxide and the inorganic polyphosphate in slug II and sodium hydroxide, sulfonate and inorganic polyphosphate in slug III. The alkali metal carbonate was not employed in these runs. Runs 8, 16, and 28 involved the use of carbonate but not the phosphate additive in each of slugs II and III as well as the presence of sodium hydroxide in each of these slugs. In the remaining run, Run 13, slug II was not injected. Thus this run involved only the injection of 0.3 pore volume of surfactant slug containing 1.5 weight percent petroleum sulfonate immediately after the 0.3 pore volume protective slug.

Table II shows the results of another set of oil displacement experiments in which the oil used to saturate the sand packed tubes was a crude oil having an acid number of 0.218. These tests were conducted similarly as those described above with reference to Table I except that the salinity was held constant in every case at 0.6 weight percent sodium chloride throughout each test and in some runs a thickening agent was added to the final displacing medium in order to simulate a mobility control slug. In each case, except for Runs 1, 3, 11, and 12 in which continuous injection was employed, slug II was preceded by a protective slug. The protective slug was injected in an amount of 0.3 pore volume and was prepared by adding 0.6 weight percent sodium chloride in fresh field water. Runs 1 through 10 in Table II were carried out at room temperature and Runs 11 through 20 were carried out at a temperature of 60° C.

TABLE II

| Run No. | $S_{oi}$ (%) | $S_{or}$ (%) | Recovery (%) | Total Slug (PV) | Slug II Size (PV) | NaOH (N) | STPP (%) | $Na_2CO_3$ (%) | Slug III Size (PV) | TRS 10-80 (%) | NaOH (N) | STPP (%) | $Na_2CO_3$ (%) |
|---|---|---|---|---|---|---|---|---|---|---|---|---|---|
| 1 | 56.15 | 23.08 | 58.90 | 1.90 | Continuous injection | | | | | | | | |
| 2 | 58.12 | 21.37 | 63.12 | 1.66 | Continuous injection | | | | | | | | |
| 3 | 57.85 | 12.81 | 77.86 | 2.54 | 0.30 | — | — | 0.50 | 0.10 | 1.50 | — | — | 0.10 |
| 4 | 58.62 | 15.09 | 74.26 | 2.10 | 0.30 | — | 0.50 | — | 0.10 | 1.50 | — | 0.10 | — |
| 5 | 58.33 | 12.08 | 79.28 | 1.99 | 0.30 | — | 0.25 | 0.25 | 0.10 | 1.50 | — | 0.05 | 0.05 |
| 6 | 56.20 | 9.92 | 82.35 | 1.83 | 0.30 | — | — | 0.50 | 0.20 | 1.50 | — | — | 0.10 |
| 7 | 56.67 | 10.83 | 80.88 | 1.95 | 0.30 | — | 0.50 | — | 0.20 | 1.50 | — | 0.10 | — |
| 8 | 55.74 | 12.30 | 77.94 | 1.77 | 0.30 | 0.04 | — | — | 0.20 | 1.50 | 0.01 | — | — |
| 9 | 56.64 | 10.18 | 82.03 | 1.81 | 0.30 | — | 0.25 | 0.25 | 0.20 | 1.50 | — | 0.10 | 0.10 |
| 10 | 56.10 | 9.76 | 82.61 | 1.75 | 0.30 | 0.04 | 0.25 | 0.25 | 0.20 | 1.50 | 0.01 | 0.05 | 0.05 |

TABLE II-continued

| Run No. | $S_{oi}$ (%) | $S_{or}$ (%) | Recovery (%) | Total Slug (PV) | Slug II | | | | Slug III | | | | |
|---|---|---|---|---|---|---|---|---|---|---|---|---|---|
| | | | | | Size (PV) | NaOH (N) | STPP (%) | $Na_2CO_3$ (%) | Size (PV) | TRS 10-80 (%) | NaOH (N) | STPP (%) | $Na_2CO_3$ (%) |
| 11 | 54.70 | 23.07 | 57.80 | 1.50 | Continuous injection | | | | | | | | |
| 12 | 56.00 | 20.80 | 62.86 | 2.00 | | 0.04 | 0.25 | 0.25 | Continuous injection | | | 0.05 | 0.05 |
| 13 | 56.41 | 4.70 | 91.67 | 2.15 | 0.30 | — | 0.25 | 0.25 | 0.20 | 1.50 | — | 0.05 | 0.05 |
| 14 | 55.46 | 5.88 | 89.39 | 2.00 | 0.30 | 0.04 | — | — | 0.20 | 1.50 | 0.01 | — | — |
| 15 | 55.10 | 2.43 | 95.59 | 1.92 | 0.30 | 0.04 | 0.25 | 0.25 | 0.20 | 1.50 | 0.01 | 0.05 | 0.05 |
| 16 | 55.10 | 2.54 | 95.39 | 2.40 | 0.30 | 0.01 | 0.05 | 0.05 | 0.20 | 1.50 | 0.04 | 0.25 | 0.25 |
| 17 | 23.07) 54.70) | 4.27 | 81.48) 92.19) | 1.88 | 0.30 | 0.04 | 0.25 | 0.25 | 0.20 | 1.50 | 0.01 | 0.05 | 0.05 |
| 18 | 55.12 | 0 | 100.00 | 2.13 | 0.30 | 0.04 | 0.25 | 0.25 | 0.20 | 1.50 | 0.01 | 0.05 | 0.05 |
| 19 | 55.00 | 3.75 | 93.18 | 2.06 | 0.30 | 0.04 | 0.25 | 0.25 | 0.20 | 1.50 | 0.01 | 0.05 | 0.05 |
| 20 | 55.75 | 0 | 100.00 | 1.86 | 0.30 | 0.04 | 0.25 | 0.25 | 0.30 | 1.50 | 0.01 | 0.05 | 0.05 |

Referring now specifically to the experiments set forth in Table II, Runs 1 and 2 represent base cases involving the continuous injection of fresh field water containing 0.6 weight percent sodium chloride and fresh field water containing 0.6 weight percent sodium chloride and 750 ppm Kelzan, respectively. Run 11 also represents a base case involving the continuous injection of a field water containing about 6 weight percent sodium chloride and divalent metal ions in an amount somewhat in excess of 1400 ppm.

In each of the runs in Table II, with the exception of the continuous injection experiments (Runs 1, 2, 11, and 12), the sulfonate concentration in slug III was held constant at 1.5 weight percent. In addition, as noted previously, the sodium chloride concentration was held constant at 0.6 weight percent for each run except in the case of Run 11 in which field water injection was employed.

In Runs 3 through 7, 9, and 13, sodium hydroxide was not present in either slug II or slug III. In Run 3, sodium carbonate was present in both slugs II and III, and in Runs 4 and 7 sodium tripolyphosphate was present in both of these slugs. Runs 5, 9, and 13 involved the injection of both the phosphate and carbonate in each of slugs II and III.

The remaining runs involved the injection of sodium hydroxide in both slugs II and III. Runs 10, 15, and 17 through 20 simulate the practice of the preferred embodiment of the invention in which the inorganic polyphosphate and the carbonate are present in both the initiation slug and the surfactant slug with the concentration of these additives in the surfactant slug being lower than the concentration in the initiation slug. Run 16 illustrates the contrasting case in which the phosphate and carbonate concentration is greater in the surfactant slug than in the initiation slug. Runs 8 and 14 illustrate the injection of an initiation slug and a surfactant slug without the presence of either the phosphate or carbonate.

Run 17 is a continuation of Run 11 and thus two figures are given for the percent oil recovery; 81.48 percent is the oil recovery based on an initial oil saturation of 23.07 percent (at the conclusion of Run 11) and 92.19 percent is the oil recovery based on the initial oil saturation of 54.7 percent at the start of Run 11.

From an examination of the data presented in Table II, it can be seen the displacement experiments employing the inorganic polyphosphate and alkali metal carbonate in conjunction with the sodium hydroxide-petroleum sulfonate system generally produce significantly higher oil recoveries than the other displacement experiments. Considering the elevated temperature experiments, the average oil recovery for Runs 15, 16, 18, 19, and 20 is 96.83 percent compared to 91.67 percent for Run 13 and 89.39 percent for Run 14. If both recovery figures from Run 17 are included, the average percent oil recovery is 93.98 percent and with the inclusion of Run 10 carried out at room temperature the average is 92.56 percent, still higher than the average recoveries experienced as a result of the other injection formats set forth in Table II.

The results of the displacement experiments set forth in Table I are somewhat difficult to interpret perhaps because of the differences in salinities, petroleum sulfonate concentration, and the milligrams of petroleum sulfonate employed per gram of sand. Run 4, the only run in Table I employing sodium hydroxide in both the initiation and surfactant slugs without the presence of either the polyphosphate or the carbonate, resulted in 90.37 percent oil recovery. The oil recoveries for Runs 2, 3, 10–12, 17, and 27 (employing sodium hydroxide, sodium tripolyphosphate, and sodium carbonate in both slugs) ranged from a low of 84.28 percent for Run 12 to a high of 95.65 percent for Run 27 with the average being 89.59 percent. This is slightly below the average of 89.72 percent for Runs 7, 15, 20–25, 29–35, and 37–39, in which both sodium hydroxide and sodium tripolyphosphate, but not sodium carbonate, were present in the initiation and surfactant slugs. Interestingly enough, the highest average oil recovery was experienced for Runs 5, 14, and 19 in which both sodium hydroxide and sodium carbonate were absent from slugs II and III. However, it will be noted that when one compares Runs 5 and 10 (in which salinity, sulfonate concentration and milligrams of sulfonate per gram of sand, and the total amount of sacrificial additives are the same) the percent oil recoveries are substantially identical.

The inconclusive results from the experimental data presented in Table I would appear to suggest that the present invention, like other oil recovery processes involving the addition of chemicals to the injected water, is specific with regard to the reservoir involved. Thus in determining the applicability of the invention to a particular reservoir, tube runs of the nature described above should first be carried out utilizing rock material and oil from the reservoir involved.

As noted previously, it is preferred in carrying out the present invention to employ an inorganic polyphosphate and alkali metal carbonate in the subsequently injected surfactant slug as well as in the initiation slug. Further it is desirable that the concentration of inorganic polyphosphate and alkali metal carbonate in the surfactant slug be lower than the concentration of these additives in the initiation slug. In this regard, the drawing, which illustrates the oil recovery achieved for Runs 15 and 16 in Table II, shows the comparative results of using relatively high and low additive concentrations in the surfactant slug.

Referring to the drawing, curves 2 and 4 are graphs showing the percent oil recovery R on the ordinate, achieved during Runs 15 and 16, respectively, plotted against the volume V in pore volumes of fluid produced on the abscissa. From an examination of curves 2 and 4 it can be seen that the residual oil saturation ultimately achieved is approximately the same. However, the oil production curve 2 associated with Run 15 shows that the oil is recovered faster by employing a higher concentration of phosphate and carbonate additives in the initiation slug than in the surfactant slug.

The inorganic polyphosphate and the alkali metal carbonate preferably are present in the initiation slug in concentrations within the range of 0.1 to 1.0 weight percent. The concentrations of these additives within the surfactant slug are, as noted previously, desirably lower and preferably are within the range of 0.1 to 0.5 weight percent. Usually it will be desirable to employ these additives in a somewhat narrower concentration range of 0.05 to 0.25 weight percent.

A thickening agent may be employed for mobility control purposes. The thickening agent may be added to the initiation slug and/or to the surfactant slug. Usually, however, it will be preferred to inject the thickening agent in a mobility control slug subsequent to the injection of the surfactant slug and to adjust the alkalinity and salinity of the mobility control slug as taught in the aforementioned Burdyn et al. application Ser. No. 570,686 Preferably, the monovalent salt salinity of the mobility control slug is within the range of 0.2 to 2.0 weight percent similarly as the initiation slug and the surfactant slug.

Various thickening agents which may be employed to increase the viscosity or apparent viscosity of the mobility control slug are well known to those skilled in the art and include such naturally occurring materials as guar gum or Karaya gum, or such synthetic materials as the polysaccharide "Kelzan" described previously, poly(glucosylglucan)s, such as disclosed in U.S. Pat. No. 3,372,749 to Williams, and available from the Pillsbury Company under the trade name "Polytran", or the partially hydrolyzed polyacrylamides available from the Dow Chemical Company under the trade name of "Pusher Chemicals". An ionic polysaccharide such as Kelzan usually will be preferred as the thickening agent for reasons set forth more fully in the aforementioned Burdyn et al. application Ser. No. 570,686.

The present invention may be carried out utilizing injection and production systems as defined by any suitable arrangement of wells. One well arrangement commonly used in waterflooding operations and suitable for use in carrying out the present invention is an integrated five-spot pattern of the type illustrated in U.S. Pat. No. 3,927,716. Other well arrangements may be used in carrying out the present invention, examples of which are set forth in the Burdyn et al. U.S. Pat. No. 3,927,716.

The several aqueous displacing slugs employed in the present invention are injected in the same pore volume amounts as corresponding slugs are employed in the Burdyn et al. application Ser. No. 570,686. By the term "pore volume" as used herein, it is meant that volume of the portion of the formation underlying the well pattern employed, as described in greater detail in the Burdyn et al. application Ser. No. 570,686.

Thus the aqueous initiation slug preferably is injected in an amount within the range of 0.02 to 2.0 pore volume. The initiation slug may be, and in most cases will be, preceded by an aqueous protective slug in the event the reservoir water contains divalent metal ions in excess of about 50 parts per million or if the reservoir water should contain relatively high concentrations of monovalent salt such as sodium chloride. The aqueous protective slug, if employed, should exhibit a monovalent salt salinity no higher than the range previously mentioned for the initiation slug and normally will be injected in an amount of up to about 1.0 pore volume.

Preferably the aqueous surfactant slug is injected in an amount within the range of 0.1 to 0.5 pore volume. This slug, like the initiation slug, should be relatively free of calcium or other divalent metal ions. Normally the divalent metal ion concentration should be less than 50 parts per million.

The relatively viscous mobility control slug, if employed, preferably is injected in an amount within the range of 0.05 to 0.3 pore volume. The viscosity of the mobility control slug desirably is graded at its leading and trailing edges between the viscosity of water and a maximum viscosity which is at least as great as the viscosity of the reservoir oil, and in any case greater than the viscosity of the preceding initiation and surfactant slugs. This is accomplished by progressively increasing the concentration of the polymeric thickening agent to its maximum value, normally within the range of 250 to 2500 parts per million in the case of Kelzan, at its leading edge, and then decreasing the concentration to zero at its trailing edge. The thickening agent concentration may be increased and decreased linearly or nonlinearly by increments.

Subsequent to the injection of the mobility control slug, a driving fluid is injected in order to displace the previously injected fluids through the formation. The driving fluid typically may be any water which is locally available and is not incompatible with the formation. The driving fluid is injected in such amount, normally within the range of 0.5 to 1.0 pore volume, as is necessary to carry the displacement process to completion.

I claim:

1. In the recovery of oil from a subterranean oil reservoir penetrated by spaced injection and production systems, the method comprising:
   a. injecting into said reservoir via said injection system an aqueous initiation slug containing an inorganic polyphosphate, an alkali metal carbonate, and an alkaline agent selected from the group consisting of alkali metal and ammonium hydroxides,
   b. thereafter injecting into said reservoir via said injection system an aqueous surfactant slug containing a sulfonate surfactant and an alkaline agent selected from the group consisting of alkali metal and ammonium hydroxides,
   c. thereafter injecting into said reservoir via said injection system an aqueous flooding medium to displace oil to said production system, and
   d. recovering oil from said production system.

2. The method of claim 1 wherein the concentrations of each of said inorganic polyphosphate and said alkali metal carbonate are within the range of 0.1–1.0 weight percent.

3. The method of claim 1 wherein said inorganic polyphosphate comprises sodium tripolyphosphate in a concentration within the range of 0.1–1.0 weight percent and said alkali metal carbonate comprises sodium carbonate in a concentration within the range of 0.1–1.0 weight percent.

4. The method of claim 1 wherein said surfactant slug contains an inorganic polyphosphate and an alkali metal carbonate.

5. The method of claim 4 wherein the concentration of inorganic polyphosphate and alkali metal carbonate in said surfactant slug is lower than the concentration of inorganic polyphosphate and alkali metal carbonate in said initiation slug.

6. The method of claim 4 wherein said initiation slug contains each of said inorganic polyphosphate and said alkali metal carbonate in concentrations within the range of 0.1–1.0 weight percent and said surfactant slug contains each of said inorganic polyphosphate and said alkali metal carbonate in concentrations within the range of 0.01–0.5 weight percent.

7. The method of claim 6 wherein said surfactant slug contains each of said inorganic polyphosphate and said alkali metal carbonate in concentrations within the range of 0.05–0.25 weight percent.

* * * * *